United States Patent

Baranowski

[11] Patent Number: 5,407,057
[45] Date of Patent: Apr. 18, 1995

[54] SUPER INFEED SYSTEM

[75] Inventor: John Baranowski, Bensalem, Pa.

[73] Assignee: Campbell Soup Company, Camden, N.J.

[21] Appl. No.: 105,177

[22] Filed: Aug. 12, 1993

[51] Int. Cl.⁶ .......................................... B65G 47/68
[52] U.S. Cl. ............................ 198/448; 198/625
[58] Field of Search .............. 198/448, 450, 625, 663

[56] References Cited

U.S. PATENT DOCUMENTS

| | | |
|---|---|---|
| 1,292,178 | 1/1919 | Waterman . |
| 2,487,354 | 11/1949 | McNamara et al. . |
| 2,753,975 | 7/1956 | Day et al. . |
| 2,857,037 | 10/1958 | Breeback . |
| 2,923,395 | 2/1960 | Von Hofe . |
| 2,943,722 | 7/1960 | Fauth . |
| 2,966,252 | 12/1960 | Meyer .............................. 198/448 |
| 3,178,006 | 4/1965 | Nigrelli et al. . |
| 3,756,586 | 9/1973 | Craft .......................... 198/448 X |
| 3,841,946 | 10/1974 | Carter . |
| 4,301,912 | 11/1981 | Cooley et al. . |
| 4,496,040 | 1/1985 | Kronseder et al. . |
| 4,526,128 | 7/1985 | Sorace et al. . |
| 4,690,267 | 9/1987 | Gradoboev et al. . |
| 4,925,001 | 5/1990 | Möllenkamp . |
| 4,974,721 | 12/1990 | Born . |
| 5,050,720 | 9/1991 | Crankshaw . |

FOREIGN PATENT DOCUMENTS

| | | | |
|---|---|---|---|
| 1344874 | 12/1963 | France ............................ 198/450 |
| 2566375 | 12/1985 | France ............................ 198/448 |
| 1074056 | 6/1967 | United Kingdom ............ 198/448 |
| 2177368 | 1/1987 | United Kingdom ............ 198/625 |

Primary Examiner—James R. Bidwell
Attorney, Agent, or Firm—Banner, Birch, McKie & Beckett

[57] ABSTRACT

A conveyance system particularly adapted for food processing utilizes an article handling apparatus including a feed device which is particularly adapted to convey cans in clusters of a predetermined uniform number to a toppler apparatus for manipulating the cans from an axis-vertical to an axis-horizontal condition. The feed device utilizes screw elements effective to receive cans from a double row and to merge them into a single row for conveyance to the toppler apparatus. The screw elements while merging the cans into a single row place the cans on a predetermined mutual spacing for unencumbered toppling.

35 Claims, 5 Drawing Sheets

SUPER INFEED SYSTEM

BACKGROUND OF THE INVENTION

The present invention relates to an article feeding apparatus. More particularly, the invention concerns apparatus including a specially configured container-handling mechanism for conveying articles, as for example bottles, cans or cartons, between operating stations in a processing system. The system and equipment described herein is particularly useful in conveying and manipulating cans in a food processing system between the can filler and closure equipment and the sterilizer.

U.S. patent application Ser. No. 07/878.693, filed May 5, 1992 by J. Baranowski, the inventor herein, and assigned to the instant assignee describes a container handling system operable between the can filler equipment in a food processing system and a hydrostatic sterilizer in such system. As described in that patent application, the contents of which are incorporated herein by reference, the concerned food processing system contains, in relevant part, a conveyor operative to transfer cans in an axis-upright condition from the filler and closure station to a toppler. The toppler operates to meter the cans, to place then in predetermined spacing suitable to accommodate the can-toppling maneuver and, thereafter, to angularly displace the cans ninety degrees from a vertical to horizontal altitude from whence they can be transferred as a "can stick" consisting of a predetermined number of cans to a carrier tray for delivery to the sterilizer.

Front- and side-load hydrostatic sterilizer equipment, including conveying, toppling and carrying components of current design, have a maximum available processing capacity of almost 1,200 cans per minute. Feed systems of the single line-type, such as that described in the aforementioned patent application, are incapable of being utilized reliably at rates significantly greater than 600 cans per rain due to the high speeds at which the cans must travel and the inability to properly monitor the cans, to meter them, and to prevent damage thereto at such speeds.

Conveying systems are well known in which articles are effectively moved at an elevated velocity through a course by reducing the speed of the articles in a critical region of the course without reducing the overall effective operational speed of the system. One such system is shown and described in U.S. Pat. No. 2,487,354 granted Nov. 8, 1949 to W. L. McNamara, et al. in which, in the critical region of the system, the articles are moved into double rows in staggered array whereby they can be conveyed at a reduced speed and returned to the normal higher velocity after emerging from the critical region thereby preserving the high speed operation of the system.

Systems such as that described in the McNamara et al. patent are designed for a continuous, uninterrupted flow of articles through the system and do not contemplate metering can delivery on a periodic start-stop basis as is required for delivering cans as "can sticks" of a predetermined can number to a sterilized carrier. Furthermore, conveying systems such as that described by McNamara et al are of a configuration rendering it unsuitable for use in a feed processing system of the type with which the present invention is concerned.

It is to the development, therefore, of an improved container handling apparatus for use in high speed food processing systems to which the present invention is directed.

SUMMARY OF THE INVENTION

The invention provides an improved container transport system, particularly useful in food processing systems for the high speed, closely-monitored transfer of containers that have been filled and closed in a filling and closing station from that station to a second station, as for example, for infeed to a sterilizer in container clusters of predetermined uniform numbers. Thus, there is provided a container transport system in which containers are transferred in an axis-upright condition from a first station and toppled to an axis-horizontal condition for transfer in predetermined numbers to a second station comprising conveyor means including means for conducting upright containers in a single line from said first station, means for distributing said containers from said single row to a double row for conducting said containers at a speed lower than that of said single line conveying means, a container feed device operative to transfer said containers from said double-row disposition into a merged single-row disposition including a pair of spaced helical screws supported above said conveying means for rotation about axes substantially parallel to the direction of movement of said conveying means, cooperating helices on said screws operative to arrange said containers in a predeterminedly spaced, longitudinally aligned array at the discharge end thereof, said helices on screws cooperating to form an inlet portion in which said containers are moved in two substantially parallel paths and a combining portion in which alternate containers are displaced oppositely into substantially merged relation, and means for oppositely rotatably driving said screws, and a toppler device operative to displace said containers from an axis-upright condition to an axis-horizontal condition for conducting said conveyors to said second station.

According to a particular aspect of the invention, there is provided a container handling apparatus which is particularly adapted for returning containers from a lower-speed, double-row disposition in a high speed processing system to a merged single-row disposition for conduct to the aforementioned second station. The container handling apparatus of the invention includes, in particular, a feed device including a pair of spaced helical screws supported above said conveyor means for rotation about axes substantially parallel thereto, said screws containing cooperating helices for arranging said containers in a predeterminedly spaced, longitudinally aligned array on said conveyor means as they travel therealong, said helices on said screws cooperating to form an inlet portion in which said containers are moved in two substantially parallel paths and a combining portion in which alternate containers are displaced oppositely into substantially single file relation, and means for oppositely rotatably driving said screws.

Advantageously, the screws in the inlet portion of the device are formed each with a single helix while, in the container portion, the screws axe formed each with double helix. In order to insure the complete discharge of two containers from the combining portion of the feed device, the helices on the respective screws are mutually offset by one-half pitch. In the combining portion of the screws the helices are provided with root diameters that axe mutually inversely variable so that each container can be engaged on diametrically opposite sides as the containers are merged from their double-row disposition into single file. Further assisting the secure engagement of the container is the formation of the crests of the helices in the container portion of the screws with concavities adapted to engage the container surface opposite the root of the cooperating helix.

In the described system the containers are passed in metered numbers and on the desired spacing from the feed device to a toppler mechanism wherein the containers are angularly displaced from an axis-vertical condition to an axis-horizontal condition for inclusion in a "stick" comprising a predetermined uniform number of containers on substantially contiguous, end-to-end disposition for delivery to the carrier. Consequently, the helices of the screws of the feed device, at least in the combining portion thereof, are formed of a progressively increasing pitch in order that the screws, in addition to effecting merger of two rows of containers into one are also effective to progressively increase the linear speed at which the containers are conveyed thus to increase their mutual spacing so as to provide adequate spacing to accommodate toppling by the toppler apparatus.

In the operation of the described container transport system the drive means for the screws of the feed device incorporates a controller which is effective to cause the screws to be rotated in a timed, intermittent manner in order to insure the discharge from the combining portion of the screws of complete container clusters of uniform numbers of containers. This is particularly desirable for the efficient feeding of containers to carriers operative in a sterilizer apparatus in order to insure that each carrier passed to the sterilizer carries a full complement of containers.

The described system further provides sensors to monitor the condition of process operation at various locations throughout the system. The output signals from these sensors are transmitted to the feed device drive controller to terminate or alter the operation of the system when further normal operation of the feed device and process system would be deleterious to the processing operation.

The principle and other objects and advantages to be derived from the invention will be apparent from consideration of the following description when considered in connection with the accompanying drawings which form a part of this specification.

DESCRIPTION OF A PREFERRED EMBODIMENT OF THE INVENTION

Figure 1:
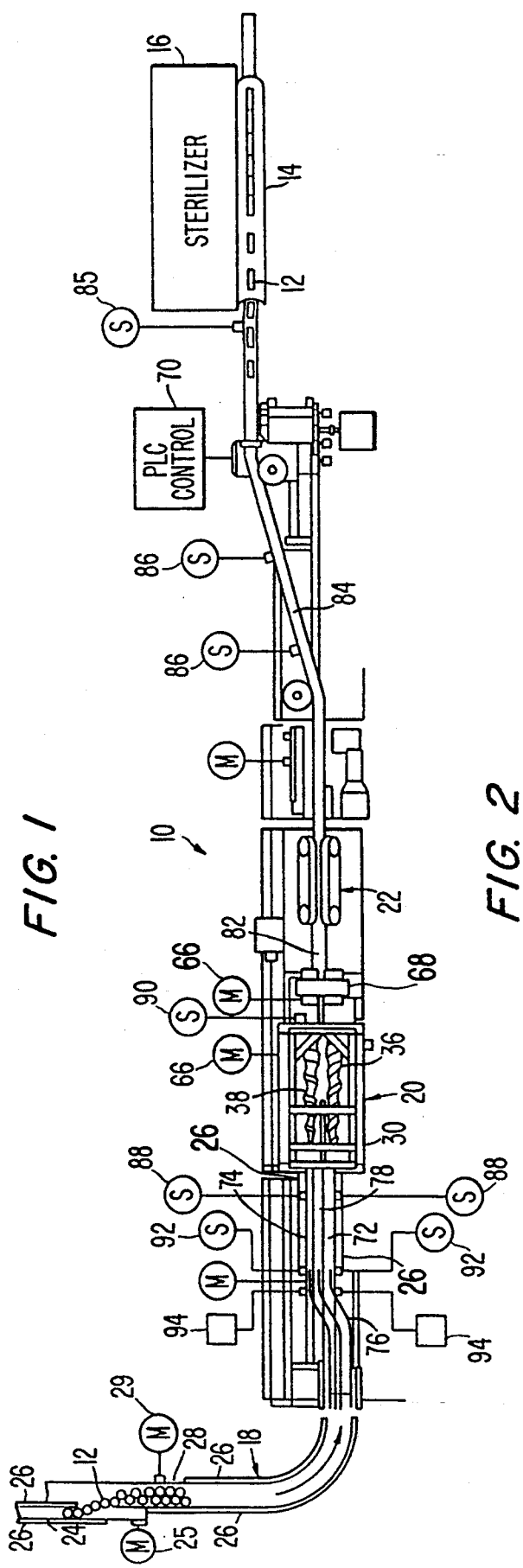
FIG. 1 is a general arrangement view of the relevant portion of a container handling apparatus according to the invention for use in a food processing system.

Referring now to the drawings wherein like reference numerals represent like parts there is shown the relevant portion of a food processing system 10 which utilizes container handling apparatus constructed and arranged according to the present invention. The illustrated portion of the food processing system 10 is that in which closed and filled food-bearing containers 12, here shown as cylindrical metal cans, are conveyed from filler and closure equipment (not shown) for ultimate disposition as "can sticks" in carriers 14 for conduct through a sterilizer 16 which, desirably, is of the hydrostatic type. Hydrostatic sterilizers are well know and are shown and described, for example, in U.S. Pat. Nos. 3,286,619, 3,511,168, 3,545,985, 3,615,725, 3,629,126 and 3,986,832.

Such sterilizers are large pieces of equipment which are used to sterilize food products that are degradable but are not to be refrigerated after being canned. In the sterilizer the containers disposed in carriers 14 are conveyed via conveyor chains along loop shaped paths through the various sterilizing operating stages, any one of which may be conducted in tower-like structures having a height of seven to ten stories. The carriers 14 in the described arrangement are configured to typically receive "can sticks" comprising twenty cans laid end-to-end in contiguous, axially aligned disposition. Of course, careers 14 have a greater or lesser capacity than twenty cans are equally usable in the practice of the invention.

The containers or cans 12 are conveyed via a conveyor arrangement, indicated generally as 18, that extends between the filler and closure equipment and the sterilizer 16 and that is adapted to covey the cans in an axis-upright condition from the filler and closure equipment to a feed device 20 and thereafter to a toppler apparatus 22 prior to deposition in the carriers 14. In the toppler apparatus 22 the cans 12 are angularly displaced from an axis-vertical to an axis-horizontal condition for delivery in predetermined uniform quantities to the carriers 14. The conveyor 18 is desirably constructed of a chain or belt which over a portion of its length has an essentially friction-free top surface that permits the conveyor to be continuously slidably driven beneath the cans, notwithstanding the cans may be unable to move, as for example, while awaiting admission to the feed device, as will be explained in more detail hereinafter. The conveyor 18 on the discharge side of the toppler apparatus 22 is preferably arranged to positively conduct the cans on their sides without slippage to the carriers 14.

With particular reference to FIG. 1, the conveyor arrangement 18 comprises a first portion, indicated as 24, disposed downstream of the filler and closure equipment that is effective to move the cans in single file relation at a relatively high velocity. The movement of the cans is guided by guide walls 26 which are essentially coextensive with the conveyors and that in this portion 24 of the arrangement are oppositely spaced by an amount corresponding to about the transverse thickness or diameter of the cans 12 so that they are restrained in single file, axis-upright disposition.

In order to effectively reduce the velocity of the cans 12 through the following portion of the conveyor, indicated as 28, the spacing of the opposed guide walls 26 is increased to an amount that is greater than the diameter of each can, but less than twice their diameter. The conveyor chain in this portion of the arrangement is caused to be driven at a reduced velocity so as to cause the cans to assume a double-row in which they are on staggered- or triangular-pitch disposition, as shown in the drawing figure.

The container feed device 20 of the invention is particularly adapted to return the cans 12 from a double-row disposition into a merged, single file disposition at which they can be returned substantially to the initial high velocity transfer speed for feeding into the toppler apparatus 22. Moreover, in moving the cans into merged relation they are automatically placed on a mutual spacing which is required for unencumbered toppling of the cans. The feed device 20 comprises a frame structure 30 having an inlet end 32 and outlet end 34 and adapted to mount a pair of particularly formed screw elements 36 and 38 over the conveyor 18 and for journaling the screw elements for rotation about axes that are parallel to the conveyor, here shown as being horizontal. In the described arrangement the screw elements 36 and 38 are approximately thirty-six inches in length and have a maximum outside diameter of about seven inches. The elements are preferably formed of high molecular weight (HMV) polyethylene material that may be turned to the desired spiral configuration in a cutting machine. The flights of the screw elements are configured for cans 12 of a specific size and are particularly adapted to engage each can at diametrically opposed points on their cylindrical wall for moving them in the manner hereinafter described.

The screw elements 36 and 38, assembled in the frame 30 as shown, cooperate to define an inlet portion 40 adjacent the inlet end 32 of the feed device 20 and a combining portion 42 adjacent the outlet end 34 thereof. The extent of the inlet portion 40 is defined generally by the inner end 48 of a partition plate 50 which depends from cross beam 52 on the frame structure 30. Along the inlet portion 40 the screw elements 36 and 38 each contain a single helix in which the respective roots 44a are relatively shallow and substantially constant in diameter with the amount of space measured transversely between the elements being such as to contain a pair of cans 12 in laterally aligned disposition on opposite sides of the plate 50. Along the combining portion 42 the screw elements 36 and 38 are each formed with a double helix whose root diameters 44b increase progressively toward the outlet end 34 of the device in order to induce a merger of the double can row into a single row as shown in FIG. 7.

The crests 46 of the screw flights are of a diameter that increases progressively throughout the inlet portion 40 of the device. At the interface between the inlet and combining portions of the respective screw elements 36 and 38 the second helix commences, appearing as a concave spiral 54 formed on a slightly greater diameter evidenced by a step 56 initiating the concave crests of the respective flights in this region of the screw element.

Figure 2:
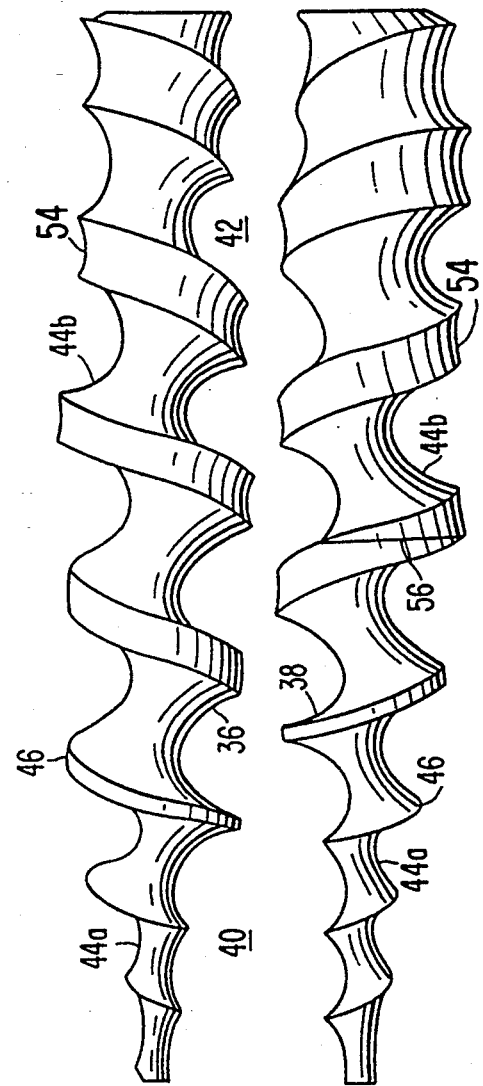
FIG. 2 is an elevational view of screw elements employed in the container feed device of the present invention.
Figure 3:
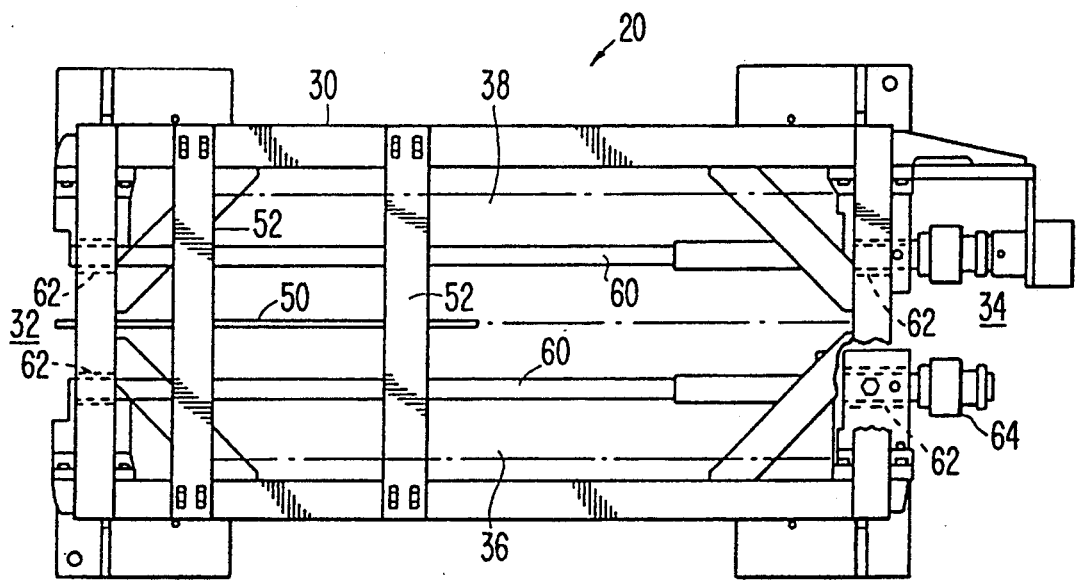
FIG. 3 is a plan view of the feed assembly of the invention utilizing the screw elements shown in FIG. 2.
Figure 4:
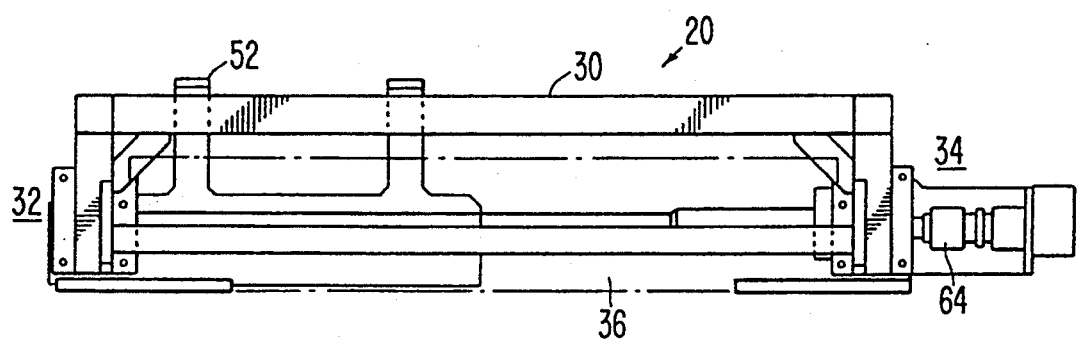
FIG. 4 is a side elevational view of the feed assembly of FIG. 3.
Figure 5:
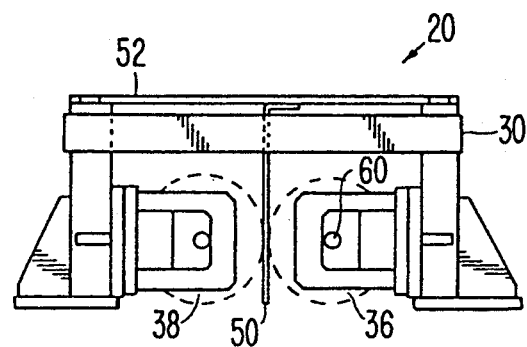
FIG. 5 is a front elevational view of the feed assembly of FIG. 3.
Figure 7:
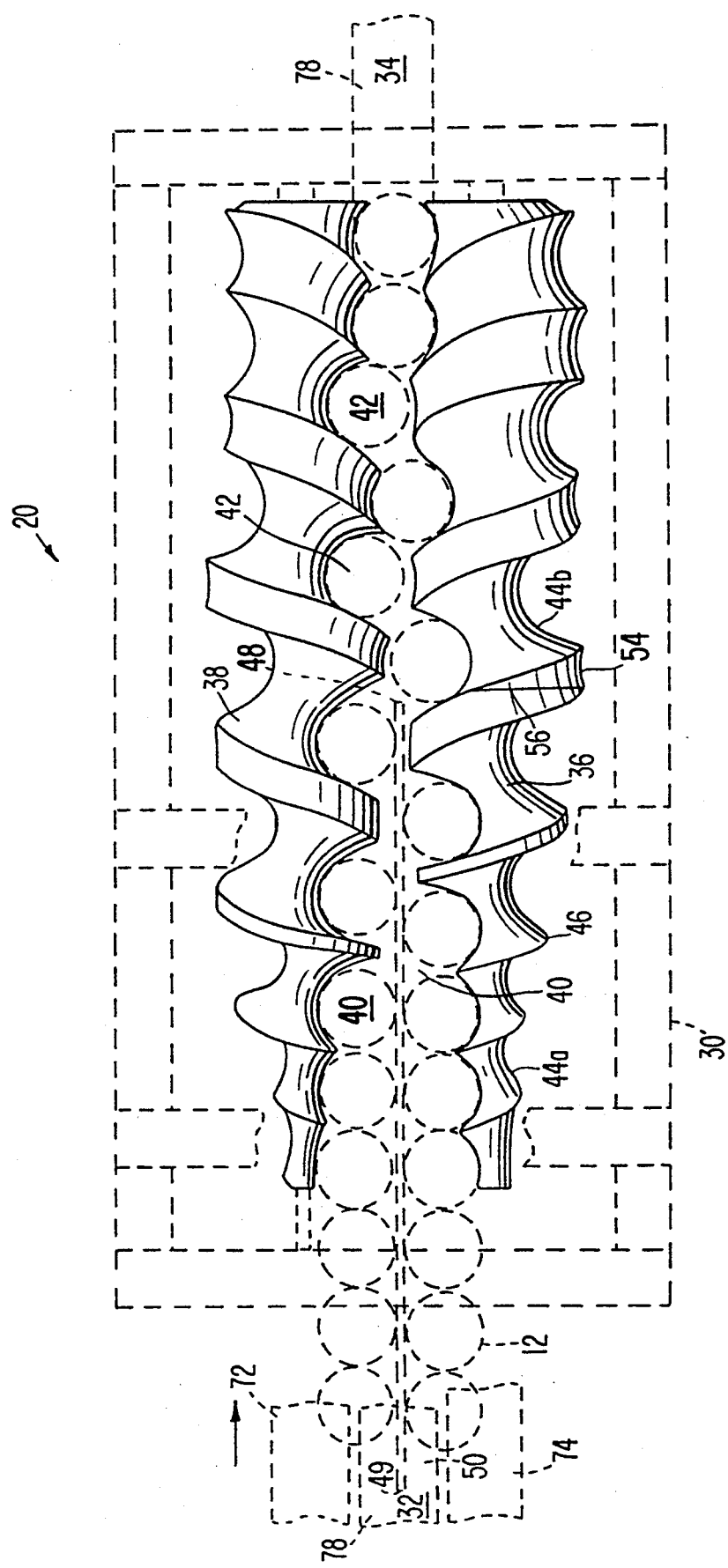
FIG. 7 is a diagrammatic plan illustration of the container handling apparatus of the invention.

As is evidenced in FIGS. 2 and 7 of the drawings the turns of the screw elements 36 and 38 are provided with a pitch that increases progressively from the inlet end 32 toward the outlet end 34 of the device in order to place the cans 12 emerging from the feed device on the mutual spacing required for unencumbered toppling.

In order to insure the controlled emergence of the desired number of cans at the outlet end 34 of the feed device 20, each of the turns on the respective screw elements 36 and 38 is displaced from those on the opposite screw element by one-half pitch. Thus, the cans 12 in the inlet portion 40 of the feed device and adjacent the inlet end 32 are disposed substantially on transversely aligned, side-by-side spacing. As a result of the simultaneous admission of a pair of cans at the inlet end 32 of the feed device 20 in the manner described, the discharge of a desired even number of cans 12 at the outlet end 34 of the feed device upon the screw elements being rotated through a finite number of complete revolutions is assured. For example, in the described organization, upon driving the screw elements 36 and 38 through exactly ten complete revolutions, the delivery of twenty cans 12 from the outlet end 34 of the feed device will result.

To facilitate the delivery of cans 12 on substantially transverse alignment to the inlet portion 40 of the feed device 20, the guide walls 26 adjacent the feed device inlet end 32 are widened slightly to a distance at least equal to about twice the diameter of the cans 12 in order that the cans can assume a side-by-side attitude immediately prior being grasped by the screw elements. Also, as shown in FIG. 7 the anterior end 49 of the pavilion plate 50 extends slightly beyond the frame structure 30 at the inlet end 32 to function as a deflector for distributing cans 12 oppositely into side-by-side relation.

The drive for the screw elements 36 and 38 may take any convenient form suitable to rotate the elements oppositely and at uniform velocities. Thus, in the described arrangement, the screw elements are each secured to an elongated drive shaft 60 that are journaled for rotation at opposite ends in bearing seats 62 formed in the frame structure 30. At one end each of the shafts 60 extends beyond its bearing seat 62 and mounts a sprocket 64 for reception of a drive belt (not shown) from the drive motor, shown diagrammatically at 66, whereby the screw elements will be caused to rotate uniformly in opposite directions.

As indicated in FIG. 1, the drive for the screw elements includes a clutch 68 and controller, here shown as programmable logic control (PLC) 70, which is effective to receive signals from the respective sensors employed in the system as hereinafter explained and to coordinate the operation of the system according to a predetermined program.

The conveyor arrangement 18 in the region of the feed device 20 comprises a pair of outer belts 72 and 74 whose surfaces move at a velocity slightly greater than the surface of the conveyor 20 in the indicated second portion 28 of the arrangement and are effective to convey cans 12 to the inlet end 32 of the feed device and to accommodate their movement by the screw elements 36 and 38. A set of parallelly formed S-shaped guide walls 76 are effective to transfer the cans 12 from the surface of conveyor 28 to a double-row disposition adjacent the feed device inlet end 32.

A third belt 78 is disposed intermediate the outer belts 72 and 74 and is driven at a speed of approximately twice that of conveyor 28. Belt 78 is adapted to receive cans 12 at the outlet end 34 of the teed device 20, which cans have been merged into a single row and placed on the desired spacing by the screw elements 36 and 38 for toppling prior to delivery to the carriers 14 associated with the sterilizer 16. Preferably, the cans 12 discharged from the feed device 20 are transferred via appropriately formed guide walls 80 to a fourth conveyor belt 82 driven at a slightly greater speed than that of belt 78 for delivery of the cans to toppler apparatus 22.

Figure 6:
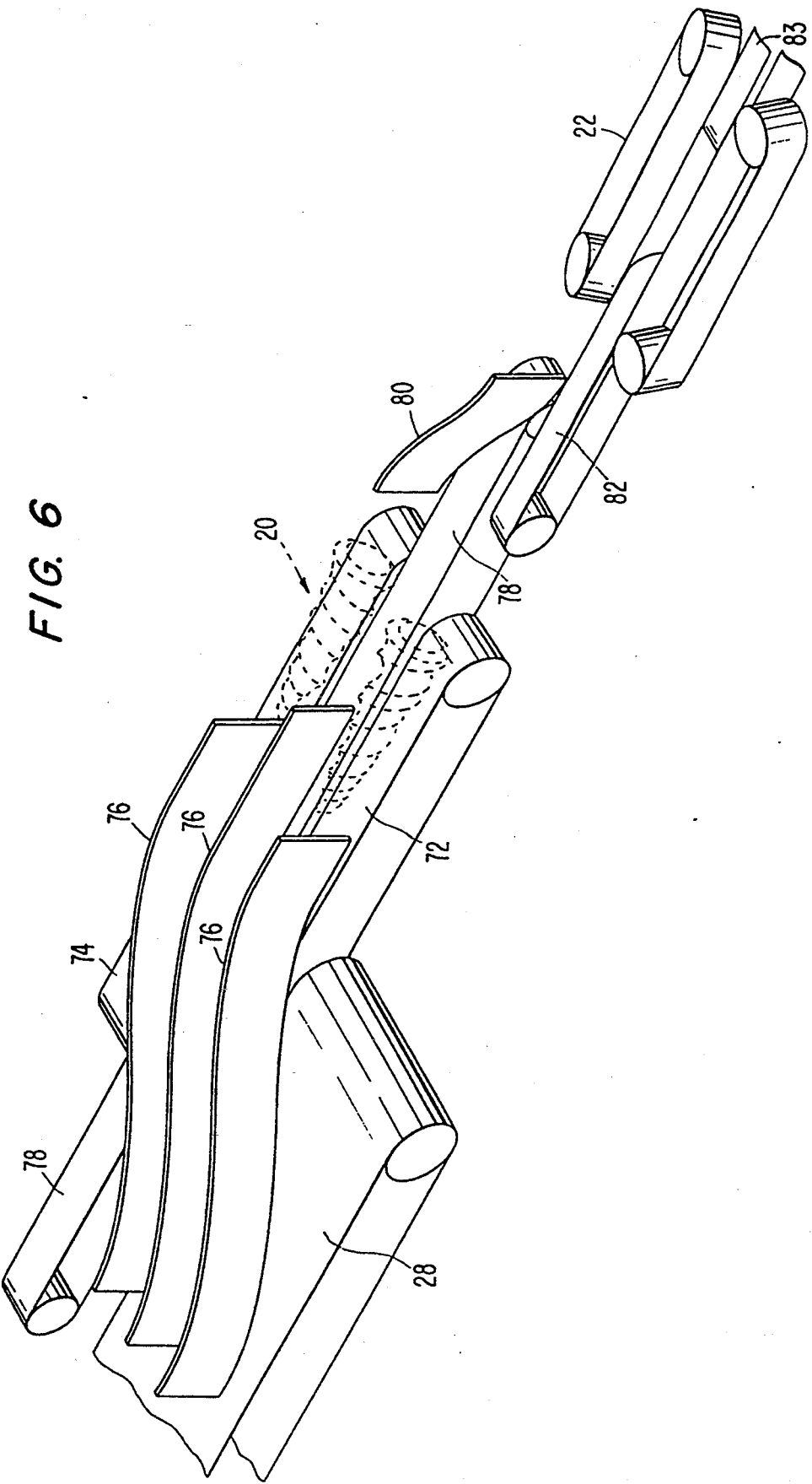
FIG. 6 is a partial perspective view of a portion of the conveyor apparatus employed in the container handling apparatus of the invention.
Figure 8:
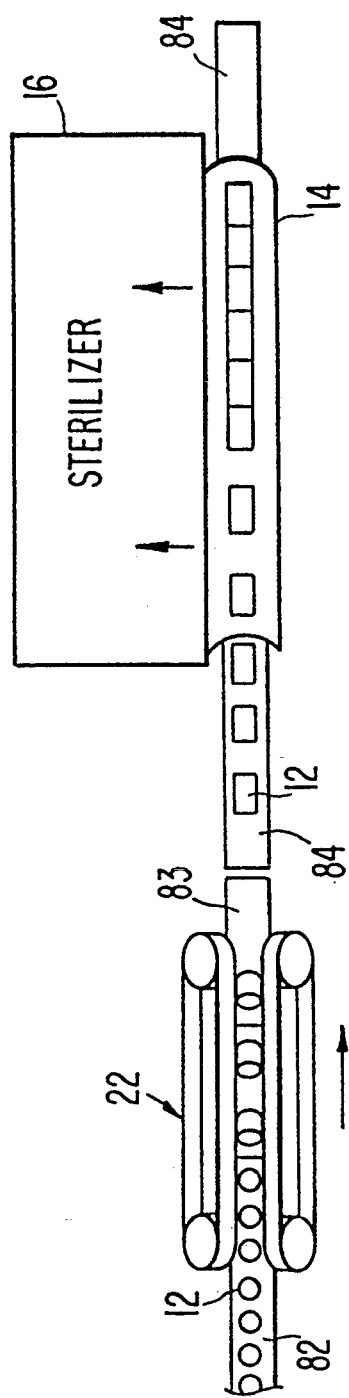
FIG. 8 is a schematic plan view of container feed device of the invention illustrating the spatial relationship of the containers in various portions of the device.
Figure 9:
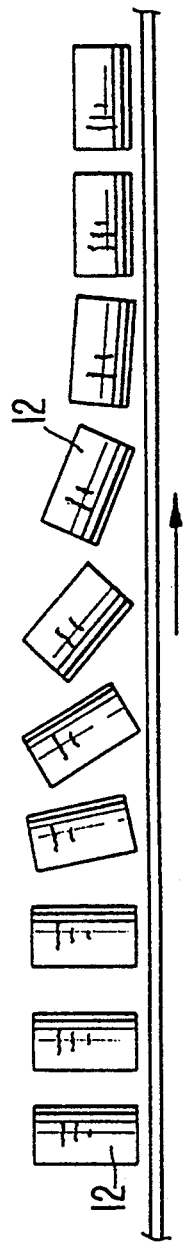
FIG. 9 is a schematic representation of the toppler, carrier and sterilizer apparatus which the container handling apparatus of the invention is particularly intended for use.

As best indicated in FIG. 6, 8 and 9, the toppler apparatus 22, which may be of conventional form, as for example, the inclined belt-type illustrated in these drawings, is effective to displace the cans 12 angularly from an axis-vertical attitude to an axis-horizontal altitude prior to delivery via yet another conveyor set comprising conveyors 83 and 84 to the carriers 14 where the cans are arranged in a "stick" consisting of the desired number of cans disposed in axially aligned, contiguous disposition. As previously explained, each carrier 14 after being loaded with the "can stick" is transferred in a known manner to the sterilizer 16 where the cans are "cooked" at a prescribed temperature and for a prescribed period of time in order to sterilize the contents.

In terms of its basic mode of operation, the described feed device 20, in order to create "can sticks" consisting of twenty cans 12 laid in axially aligned, contiguous relation in each carrier 14, is filled with cans 12 received from conveyor belts 72 and 74 and driven via drive motor 66 and clutch 68 to rotate the screw elements 36 and 38 for ten revolutions on a periodic basis. The period of dwell in each operational cycle of the feed device 20 can be variably controlled by the PLC controller 70 and is dependant upon the travel speed of the carriers 14 in the sterilizer 16, the operation of the feed device being such as to deliver twenty cans 12 on proper spacing to the toppler apparatus 22 where the cans are angularly displaced onto their sides and delivered in a timed manner to the carriers 14 in sterilizer 16.

Control for the described article handling system is provided principally by the programmable logic controller (PLC) 70 with intelligence input provided by various sensors, the controller being operative in response to a programmed mode and signals from the sensors being operative to effect the controlled operation of the system components. Sensors of well know type may be employed to transmit signals to controller 70. For example, all of the sensors indicated as 85, 86, 88 and 90 may be of the photocell or other conventional form capable of detecting the presence or absence of a can structure. Moreover, all of sensors 84 through 90, when activated are effective by transmission of appropriate signals to controller 70 to terminate system operation pending correction of the sensed objectionable condition. Sensor 85 termed the "jam" sensor is provided immediately adjacent the mechanism for transferring cans to the carriers 14 for forming the "can stick" therein. In detecting the presence of can structure outside the proximal end of the apparatus, this sensor is effective to determine that more than twenty cans have been delivered for transfer to the carrier or, alternatively, that a full complement of twenty cans has tailed to be delivered to the carrier since a can structure is sensed exteriorly of the mechanism. Sensors 86 positioned at longitudinally spaced points along conveyor 84 are effective to detect the downstream of the toppler apparatus 22 pressure of any can structure in a standing condition disruptive in this region of the system. Sensors 88 are termed the "can down" sensors and are positioned to "detect" the attitude of the cans 12 in the double rows immediately preceding the inlet end 32 of the feed device 20.

Finally, sensor 90 is a position-sensitive sensor operative with the screw elements 36 and 38 and adapted to detect these elements during the dwell period of the feed device operating cycle to determine whether they are accurately positioned at the start point for the rotational phase to the cycle.

Sensors 92, termed the "can supply" sensors, are positioned with respect to the respective conveyors 72 and 74 and sufficiently remote from the inlet end 32 of feed device 20 to determine the existence of the necessary number of cans 12 in the double rows awaiting admission to the feed device. The presence of an adequate number of cans in this region of the system is important, not only to insure the conveyance of a full complement of twenty cans during operation of the feed device 20 but also to provide adequate back pressure against the cans to induce their movement in the direction of the feed device. Thus, these sensors, which are arranged for the transmission of signals on a timed basis, if not activated within the requisite period, are operative to actuate magnetically operated can stops 94 that prevent the passage of additional cans along the conveyors 72 and 74. In this way the delivery of any relatively rapidly moving cans to the rotating screw elements, together with the disruptive effects that would result, are prevented.

However, recognizing that the feed device 20, when filled, can contain sixteen cans and being cognizant of the need to prevent excessive temperature loss from the food produce within the cans, control for the system contemplates and actuation of the screw element drive motor 66 sufficient to impart five revolutions to the elements and, thus, the ultimate delivery of ten cans to the sterilizer 16 for processing.

It will be understood that various changes in the details, materials and arrangement of parts which have been herein described and illustrated in order to explain the nature of the invention, may be made by those skilled in the art within the principle and scope of the invention as expressed in the appended claims.

I claim:

1. A container handling apparatus including a feed device for transferring containers from a double row supply source in predeterminedly spaced, merged, single row alignment, said apparatus comprising:

conveyor means for moving containers in two parallel rows to the inlet end of said feed device and in a single row from the outlet end thereof;

said feed device including a pair of spaced helical screws supported above said conveyor means for rotation about axis substantially parallel thereto;

said screws containing cooperating helices having roots and crests for arranging said containers in a predeterminedly spaced, longitudinally aligned array on said conveyor means as they travel therealong;

said helices on said screws cooperating to form an inlet portion in which said containers are moved in two substantially parallel paths and a combining portion in which alternate containers are displaced oppositely into substantially single file relation, said screws at said inlet portion comprising a single helix and said screws at said combining portion comprising double helices, wherein, the roots of said single helix along a portion thereof are disposed substantially opposite each other with a space measured transversely between said oppositely disposed roots sufficient to contain a pair of containers in laterally aligned disposition; and means for oppositely rotatably driving said screws.

2. The apparatus recited in claim 1, wherein, the roots of said single helix along said portion thereof have a substantially constant diameter.

3. Container handling apparatus according to claim 1 in which said containers are moved in substantially transversely aligned relation in said feed device inlet portion.

4. Container handling apparatus according to claim 3 in which said helices in the respective screws in said combining portion are mutually offset by one-half pitch.

5. Container handling apparatus according to claim 4 in which said helices in the combining portion of the respective screws have container-engaging surfaces whose root diameters are mutually inversely variable for displacing said containers into merged relation.

6. Container handling apparatus according to claim 1 in which said helices, at least in said combining portion of said screws, are formed of a progressively increasing pitch.

7. Container handling apparatus according to claim 1 including an elongated partition plate extending longitudinally between said screws in the inlet portion thereof.

8. Container handling apparatus according to claim 1 in which said conveyor means at said outlet end of said apparatus moves at a velocity greater than that at said inlet end.

9. Container handling apparatus according to claim 8 in which said conveyor means at said outlet end of said apparatus moves at a velocity about twice that at said inlet end.

10. Container handling apparatus according to claim 1 in which said drive means includes a drive motor and means for commonly connecting said motor to said helical screws.

11. Container handling apparatus according to claim 1 including a controller for operating said drive means for timed, intermittent operation of said screws.

12. Container handling apparatus according to claim 11 in which said operation of said screws includes a period of pause between periods of rotation, said pause period being of a duration sufficient for delivery of a predetermined number of containers to said feed apparatus inlet end for transfer from said inlet end to the outlet end thereof.

13. Container handling apparatus according to claim 12 including means for sensing the number of cans at the inlet end of said feed screws, said sensing means cooperating with said controller to terminate rotation of said screws when an insufficient number of containers is available adjacent the inlet end of said feed device.

14. A container handling apparatus including a feed device for transferring containers from a double row supply source in predeterminedly spaced, merged, single row alignment, said apparatus comprising:

conveyor means for moving containers in two parallel rows to the inlet end of said feed device and in a single row from the outlet end thereof;

said feed device including a pair of spaced helical screws supported above said conveyor means for rotation about axis substantially parallel thereto;

said screws containing cooperating helices for arranging said containers in a predeterminedly spaced, longitudinally aligned array on said conveyor means as they travel therealong;

said helices on said screws cooperating to form an inlet portion in which said containers are moved in two substantially parallel paths and a combining portion in which alternate containers are displaced oppositely into substantially single file relation;

means for oppositely rotatably driving said screws; and a controller for operating said drive means for timed, intermittent operation of said screws, wherein, the operation of said screws includes a period of pause between periods of rotation, said pause period being of a duration sufficient for delivery of a predetermined number of containers to said feed apparatus inlet end for transfer from said inlet end to the outlet end thereof.

15. A container transport system in which containers are transferred in an axis-upright condition from a first station and toppled to an axis-horizontal condition for transfer in predetermined numbers to a second station comprising:

conveyor means including means for conducting upright containers in a single line from said first station, means for distributing said containers from said single row to a double row for conducting said containers at a speed lower than that of said single line conveying means;

a container feed device operative to transfer said containers from said double row disposition into a merged single row disposition including:

a pair of spaced helical screws having roots and crests supported above said conveying means for rotation about axes substantially parallel to the direction of movement of said conveying means, cooperating helices on said screws operative to arrange said containers in a predeterminedly spaced, longitudinally aligned array at the discharge end thereof, said helices on screws cooperating to form an inlet portion in which said containers are moved in two substantially parallel paths and a combining portion in which alternate containers are displaced oppositely into substantially merged relation, said screws at said inlet portion comprising a single helix and said screws at said combining portion comprising double, helices, wherein, the roots of said single helix along a portion thereof are disposed substantially opposite each other with a space measured transversely between said oppositely disposed roots sufficient to contain a pair of containers in laterally aligned disposition, and means for oppositely rotatably driving said screws; and a toppler device operative to displace said containers from an axis-upright condition to an axis-horizontal condition for conducting said conveyors to said second station.

16. The apparatus recited in claim 15, wherein, the roots of said single helix along said portion thereof have a substantially constant diameter.

17. A container transport system according to claim 15 in which said conveyor means includes oppositely spaced conveyors underlying said feed device for moving said containers from an inlet end of said feed device into the inlet portion thereof and a separate conveyor intermediate said spaced conveyors for conducting containers in merged relation from the combining portion of said feed device.

18. A container transport system according to claim 17 in which the speed of said intermediate conveyor is greater than that of said spaced conveyors.

19. A container transport system according to claim 15 including means for disposing said containers on transversely aligned disposition at the inlet end of said container feed device, said means comprising container guide plates effective to guidingly transfer said containers in substantially parallel, double-row disposition to an inlet end of said feed device said guide plates including a partition plate extending longitudinally between said screws in the inlet portion thereof.

20. A container transport system according to claim 19 in which said guide plate is substantially coextensive with the inlet portion of said feed device.

21. A container transport system according to claim 20 in which the helices on the respective screws of said feed device are single helices adjacent said partition plate.

22. A container transport system according to claim 21 in which the helices on the respective screws downstream, in the container moving direction, from said partition plate are double helices.

23. A container transport system according to claim 22 in which the helix crests on the respective screws at said combining portion are mutually offset by about one-half pitch.

24. A container transport system according to claim 23 in which said double helices have container-engaging surfaces whose root diameters are mutually variable for displacing said containers oppositely into merged relation.

25. A container transport system according to claim 24 in which said helices, at least in said combining portion of said screws, are formed of a progressively increasing pitch.

26. A container transport system according to claim 15 in which said drive means includes a controller for rotating said screws in timed, intermittent sequence for delivering containers from said feed device in clusters containing a predetermined number of containers.

27. A container transport system according to claim 26 in which the operating sequence of said screws includes a period of pause between periods of rotation, said pause period being of a duration sufficient for delivery of a predetermined number of containers to said feed device inlet end for delivery of the requisite number of containers in each cluster produced during the subsequent period of screw rotation.

28. A container transport system according to claim 27 including means for sensing the number of cans available at said feed device inlet end, said sensing means cooperating with said controller to terminate rotation of said screws when an insufficient number of containers is available adjacent the inlet end of said feed device.

29. A container transport system, said system transporting containers from a first location in which the containers are moved in a substantially contiguous, single file arrangement to a second location in which the containers are moved in a single file arrangement with a predetermined spacing therebetween, said system comprising:
- means for causing the containers moving from the first location to assume a substantially contiguous double row relationship;
- a pair of rotatable screws disposed substantially parallel to each other in a spaced relationship, each said screw including an inlet portion disposed opposite each other, said inlet portions spaced from each other a distance substantially equal to twice the diameter of the containers,
- control means for causing said screws to rotate through a predetermined number of rotations in a predetermined period of time; wherein,
- during said predetermined period of time, each container of a predetermined number of successive lead pairs of containers from the double row simultaneously enters said screws at said inlet portions with the containers in each pair disposed between said inlet portions in a laterally aligned disposition, and after the rotation of said screws through the predetermined number of rotations, the containers exit said screws in a single file arrangement with a predetermined spacing therebetween.

30. The system recited in claim 29, the screws rotated during successive periods of time, said control means causing the screws to not rotate for a predetermined pause between each successive period so as to allow a group containing a predetermined number of containers to exit the screws before a successive group exits the screws.

31. A feed device for transferring containers from a double row alignment into a single row alignment, said device comprising a pair of spaced rotatable screws, said screws disposed substantially parallel to each other in a spaced relationship and having alternating roots and crests, each said screw including at least a first portion which is a single helix defined by said alternating roots and crests and a second portion which is a double helix defined by said alternating roots and crests in which said crests are concave, wherein,
- the roots of said screws in said first portions are disposed substantially opposite each other with a space measured transversely between said oppositely disposed roots sufficient to contain a pair of containers in laterally aligned disposition.

32. The device recited in claim 31, the roots of said screws in said first portion having a substantially constant diameter.

33. The device recited in claim 31 further comprising:
- conveyor means for moving containers towards one end of said screws and away from the other end of said screws.

34. The device recited in claim 33, said conveyor means comprising a conveyor belt disposed below said screws and extending beyond each end of said screws.

35. The device recited in claim 33 further comprising means for oppositely rotatably driving said screws.

* * * * *